(12) United States Patent
LaConte

(10) Patent No.: US 6,367,200 B1
(45) Date of Patent: Apr. 9, 2002

(54) QUICK RELEASE AND FASTENING COVER

(75) Inventor: Richard J. LaConte, Black Diamond, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/219,550

(22) Filed: Dec. 22, 1998

(51) Int. Cl.[7] ............................. E05C 21/02; E06B 7/18
(52) U.S. Cl. ........................... 49/465; 49/463; 49/466; 49/318
(58) Field of Search .................... 49/395, 463, 465, 49/466, 279, 316, 317, 318, 319

(56) References Cited

U.S. PATENT DOCUMENTS

| | | | |
|---|---|---|---|
| 731,006 A | * 6/1903 | Wolfensperger | 49/317 |
| 1,007,726 A | * 11/1911 | Olson | 49/319 |
| 1,287,290 A | * 12/1918 | Golden | 49/35 |
| 1,416,308 A | * 5/1922 | Silverman et al. | 114/117 |
| 3,088,548 A | 5/1963 | Behrens et al. | |
| 3,209,663 A | * 10/1965 | Baier | 49/395 |
| 3,449,860 A | * 6/1969 | Franks et al. | 49/317 |
| 3,563,406 A | * 2/1971 | Ferrante | 220/248 |
| 3,694,145 A | * 9/1972 | Stevens | 49/318 |
| 4,256,701 A | 3/1981 | Johansson | |
| 4,349,991 A | 9/1982 | Schwiers et al. | |
| 4,523,407 A | * 6/1985 | Miller | 49/465 |
| 4,534,192 A | 8/1985 | Harshbarger et al. | |
| 4,543,748 A | * 10/1985 | North | 49/395 |
| 4,789,077 A | 12/1988 | Noe | |
| 4,823,976 A | 4/1989 | White et al. | |
| 4,890,418 A | * 1/1990 | Sachs | 49/463 |
| 4,891,910 A | * 1/1990 | Cook et al. | 49/395 |
| 4,984,832 A | 1/1991 | Canepa | |
| 5,236,153 A | 8/1993 | LaConte | |
| 5,283,979 A | * 2/1994 | Carlson et al. | 49/395 |
| 5,778,708 A | 7/1998 | Crosby et al. | |

FOREIGN PATENT DOCUMENTS

| | | | | |
|---|---|---|---|---|
| GB | 1876 | * | 2/1890 | 49/463 |
| IT | 710180 | * | 6/1966 | 49/395 |

\* cited by examiner

*Primary Examiner*—Gregory J. Strimbu
(74) *Attorney, Agent, or Firm*—Robert H. Sproule; Lawrence W. Nelson

(57) ABSTRACT

A quick release panel assembly comprising a panel which is releasably fastened to a structure by a release and locking assembly. The release and locking assembly includes a driver element and four actuating arms that are pivotally connected to the driver element, the cover, and to four respective locking mechanisms located at each edge of the panel. The driver element moves the actuating arms between first and second positions to move the locking mechanisms between a locking position to fasten the cover to the structure and an unlocking position.

5 Claims, 5 Drawing Sheets

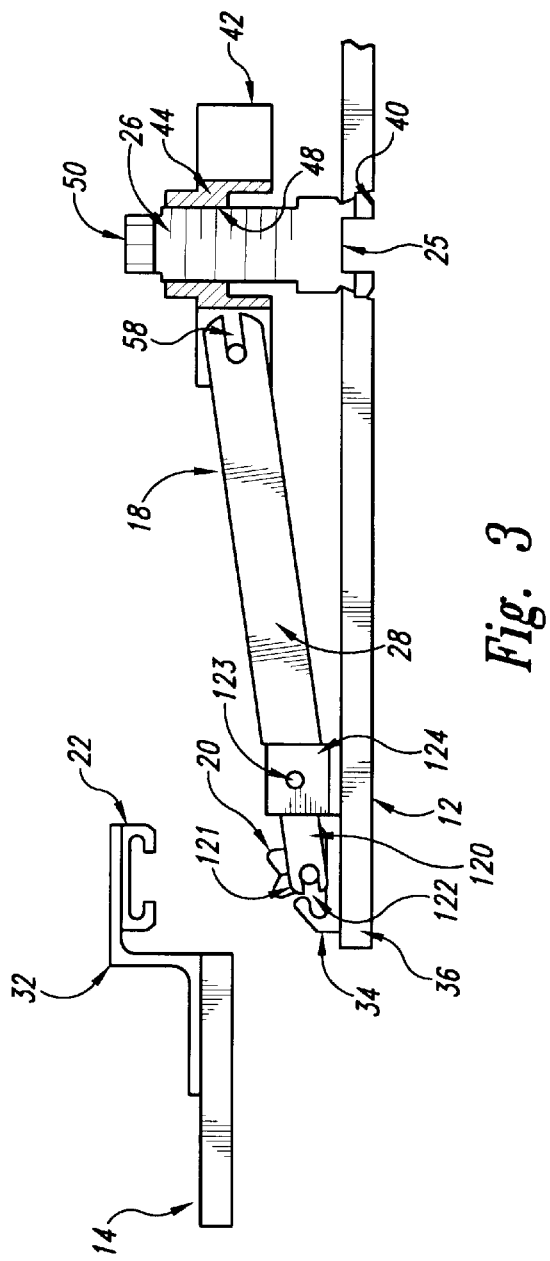
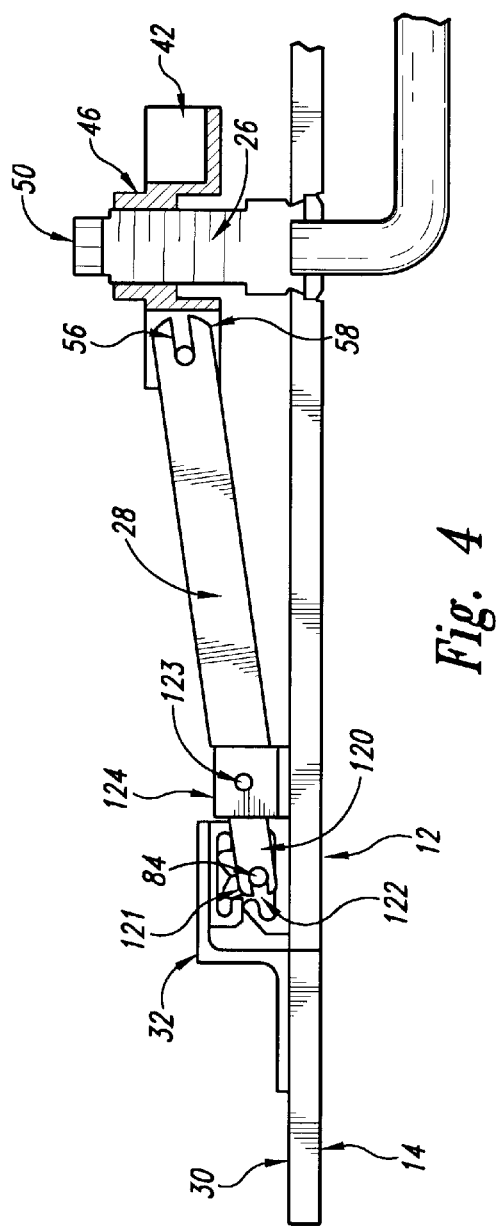

QUICK RELEASE AND FASTENING COVER

TECHNICAL FIELD

The present invention pertains to a panel that is covers an opening, and more particularly to a load bearing panel for an aircraft that quickly attaches to and is released from aircraft structure surrounding the opening.

BACKGROUND

There is often a need to have a panel for covering an opening such that the panel can be quickly fastened to and removed from structure surrounding the opening. In addition, there is sometimes a need for the panel to be able to support and transmit loads from the structure.

In the past, removable load bearing panels have been attached to the surrounding structure by numerous removable fasteners that have had several drawbacks. First, it was time consuming to individually attach and remove each fastener when it was necessary to remove or install the panel. In addition, the fasteners typically had a limited life based upon the number of times the panels were removed or installed. Once the fasteners exceeded their useful life, they had to be replaced. Also, during the installation and removal process, the fasteners tended to become lost or misplaced, resulting in additional expense.

In addition, previous removable load bearing panels had to be precisely interlocked to the surrounding structure to ensure the structural loads were properly transferred through the panels. Because of this precision requirement, it was very difficult for these panels to be interchanged with like panels on the same aircraft or with like panels on other aircraft of the same model.

Another approach to this problem has been to eliminate the requirement for the panels to be load bearing. However, this has required that the structure around the opening be strengthened considerably so that the structural loads were routed around the opening rather than through the panel. This strengthening of the structure around the opening resulted in a significant increase in weight to the structure and resulted in additional expense.

A number of locking and fastening mechanisms have been disclosed. For example, U.S. Pat. No. 5,236,153 by LaConte, the inventor of the present invention, pertains to a quick fastening and release system for securing commercial aircraft fixtures such as seats, lavatories and bulkheads, to the cabin floor. U.S. Pat. No. 3,088,548 by Behrens et al pertains to a door that is sealed closed by four locking elements that are actuated by rotation of a control plate. Furthermore, U.S. Pat. No. 4,534,192 by Harshbarger et al pertains to a door that is locked in a closed position by a system of bolts that are simultaneously operated by a handle.

None of the aforementioned devices, however, provide the unique combination of features of the present invention. Accordingly, there is a need for a panel that can be quickly attached and removed from a structure, and that has the ability to transmit loads from the structure.

SUMMARY

The present invention pertains to apparatus for connecting a cover having a first edge portion and a second edge portion to a structure having an opening. The apparatus includes first and second connectors that are movable between fastened positions where the cover first and second edge portions are fastened to edges of the structural opening, and unfastened positions where the cover first and second edge portions are not fastened to the edges of the structural opening. In addition, there is an actuator that is accessible through an opening in the cover so that the actuator may be moved between a fastened position and an unfastened position. An actuator arm is connected between the actuator and the first connector and the second connector such that movement of the actuator between the fastened position and the unfastened position causes the actuator arm to move the first connector and the second connector together between their respective fastened positions so as to fasten the cover over the opening, and their respective unfastened positions so as to allow the cover to be removed from the opening.

DESCRIPTION OF THE FIGURES

Other features of the present invention will be discussed in the following Detailed Description of the Invention in conjunction with the accompanying drawings, in which:

FIG. 3 is a side view of the panel assembly showing the panel assembly in the uninstalled position;

FIG. 4 is a side view of the panel assembly in a partially installed position whereby the panel is covering the opening, but is not locked to the structure;

DETAILED DESCRIPTION OF THE INVENTION

Figure 1:
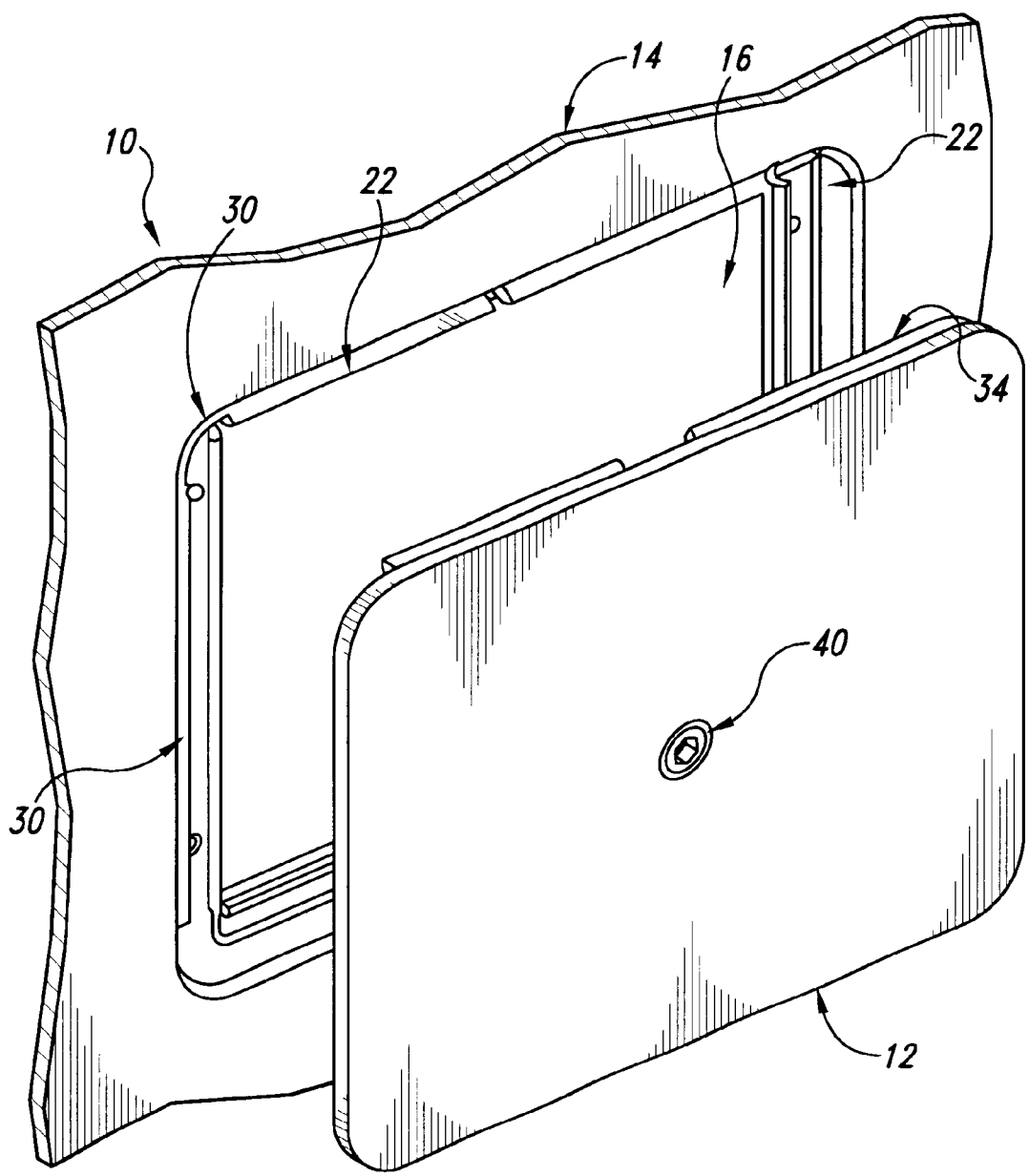
FIG. 1 is a front isometric view of the panel assembly of the present invention in an uninstalled position, and showing a panel and a structural opening.
Figure 2:
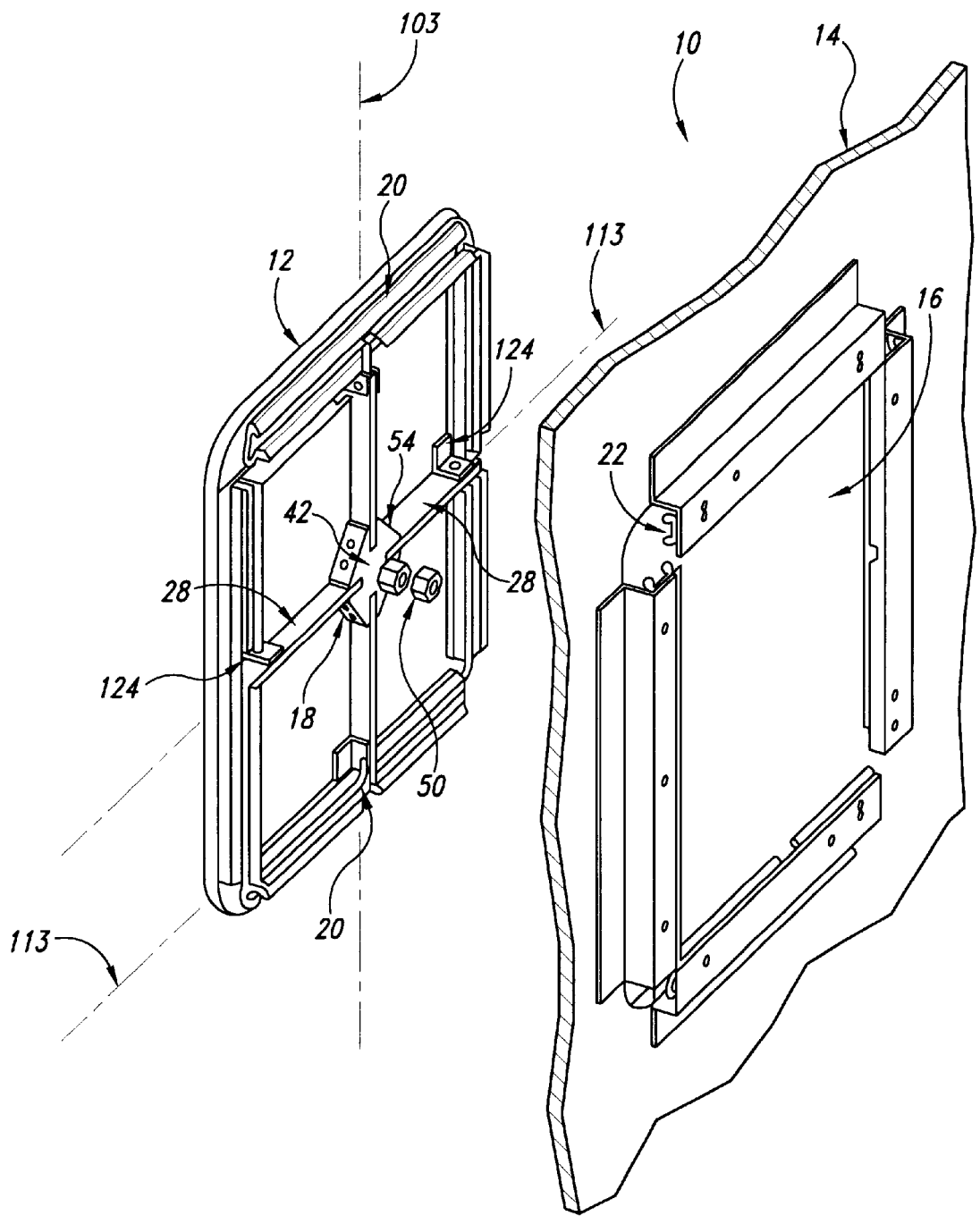
FIG. 2 is rear isometric view of the panel assembly in the uninstalled position and showing the panel and the structural opening.

Before providing a detailed description of the present invention, a brief overview of the invention and its operation will be discussed. Reference is made to FIG. 1 where there is shown the quick release and locking panel assembly of the present invention generally indicated at 10, and including a panel indicated at 12 and a structure indicated at 14 that surrounds an opening indicated at 16. As shown in FIG. 2, the panel assembly 10 includes a quick release and fastening assembly indicated at 18 that allows the panel 12 to be quickly attached to and removed from the structure 14 that surrounds the opening 16.

Figure 5:
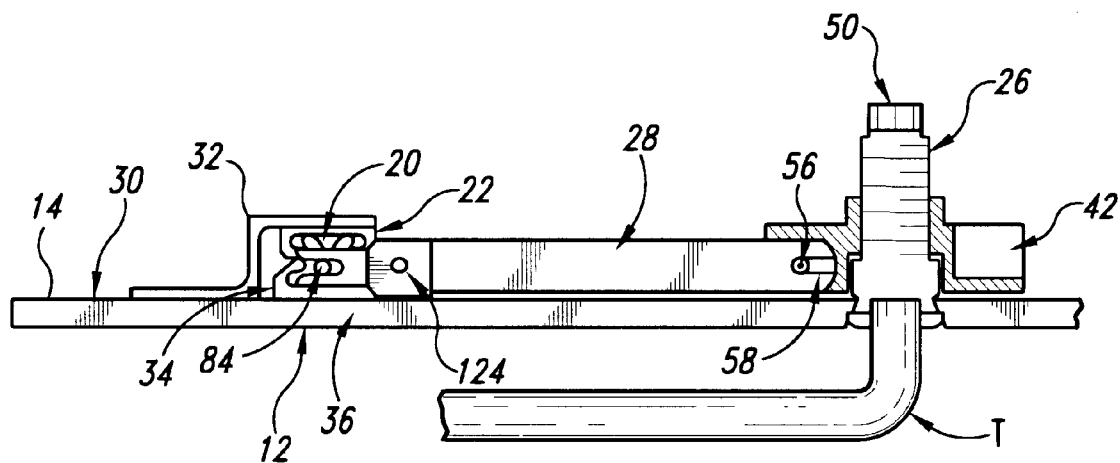
FIG. 5 is a side view of the panel assembly in the installed position whereby the panel is covering the opening and is locked to the structure.

As shown in FIGS. 2 and 3, the quick release and fastening assembly 18 has four release and locking mechanisms indicated at 20. When the panel 12 is placed over the opening 16 as shown in FIG. 4, the release and locking mechanisms 20 engage respective locking channel receptacles 22 that are connected to the structure 14 around the opening 16. Once the mechanisms 20 have engaged the locking channel receptacles 22, a drive tool T that is inserted in an end receptacle 25 of an actuation screw 26, is used to rotate the actuation screw 26 in a manner that causes movement of a driver element 42 in a downward direction (when viewing FIGS. 3 through 5). This downward movement of driver 42 causes each right end of the four actuation arms 28 to also move in the downward direction that in turn causes their respective left ends to move in an upward direction. This causes the release and lock mechanisms 20 to move from their unlocked positions shown in FIGS. 4 and 6, to their locked positions shown in FIGS. 5 and 7. In this manner the panel 12 is securely fastened to the structure 14 over the opening 16. Rapid removal of the panel 12 from the structure is accomplished by reversing this procedure.

Having provided a brief overview of the present invention, the panel assembly 10 now will be described in more detail. Referring again to FIG. 1, the opening 16 has a generally rectangular configuration such that each edge 30 of the structure 14 around the opening 16 supports one locking channel receptacle 22. Each channel receptacle 22 extends the length of and is securely attached to a respective edge 30 by a lengthwise extending support 32 having a generally Z-shaped cross sectional configuration. In this manner the channel receptacle 22 is spaced away from the surface of the structure 14 so as to allow it to receive the release and locking mechanism 20 while allowing the panel 12 to align with the plane of structure 14.

When the panel 12 is in the installed position, there is located directly opposite from each locking channel receptacle 22 a panel locking channel receptacle 34 that is securely attached to each edge 36 of the panel 12. The channel receptacle 34 of the panel 12 has the same configuration as the channel receptacle 22 of the structure 14.

As shown in FIGS. 2 and 3, the quick release and fastening assembly 18 includes the threaded actuation screw 26 that is attached through an opening in the panel 12 by an attachment ring 40 in a manner that permits rotation of the screw 26. Supported on the actuation screw 26 is the driver 42 that has a rectangular, box-like housing 44 with a cylindrical boss 46 that extends upward (when viewing FIG. 3) from the center of the housing 44. The housing 44 and boss 46 have a common internal female threaded portion 48 so that driver 42 moves in a vertical axial direction along actuation screw 26 when the housing 44 is rotated by tool T. Maximum upward movement of the driver 42, when viewing FIG. 3, is limited by a nut 50 that is secured to the upper end of screw 26 and that rotates with screw 26.

In order to receive each of the four actuation levers 28, there is located at each side of the housing 44 a U-shaped recess 54 (FIG. 2) having a pivot pin 56 (FIG. 3) that extends across the recess 54 and through a U-shaped slot 58 in the right end of each actuation arm 28. In this manner, each of the four actuation arms 28 has its right end pivotally engaged with the pivot pin 56 so as to allow the right end of the actuation arm 28 to both pivot around its respective pivot pin 56 and to move in an axial left or right direction when driven by the vertical movement of the driver 42.

Figure 6:
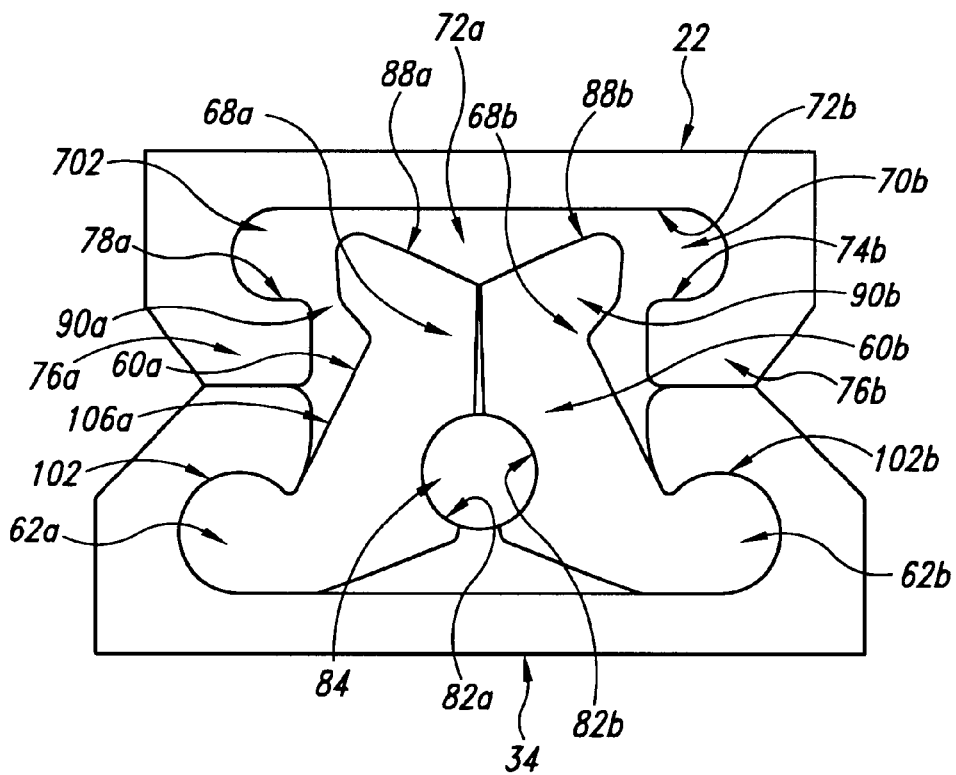
FIG. 6 is a plan view of a portion of a locking mechanism of the panel assembly in the partially installed position; and, FIG. 7 is a plan view of a portion of the locking mechanism in the fully installed position.
Figure 7:
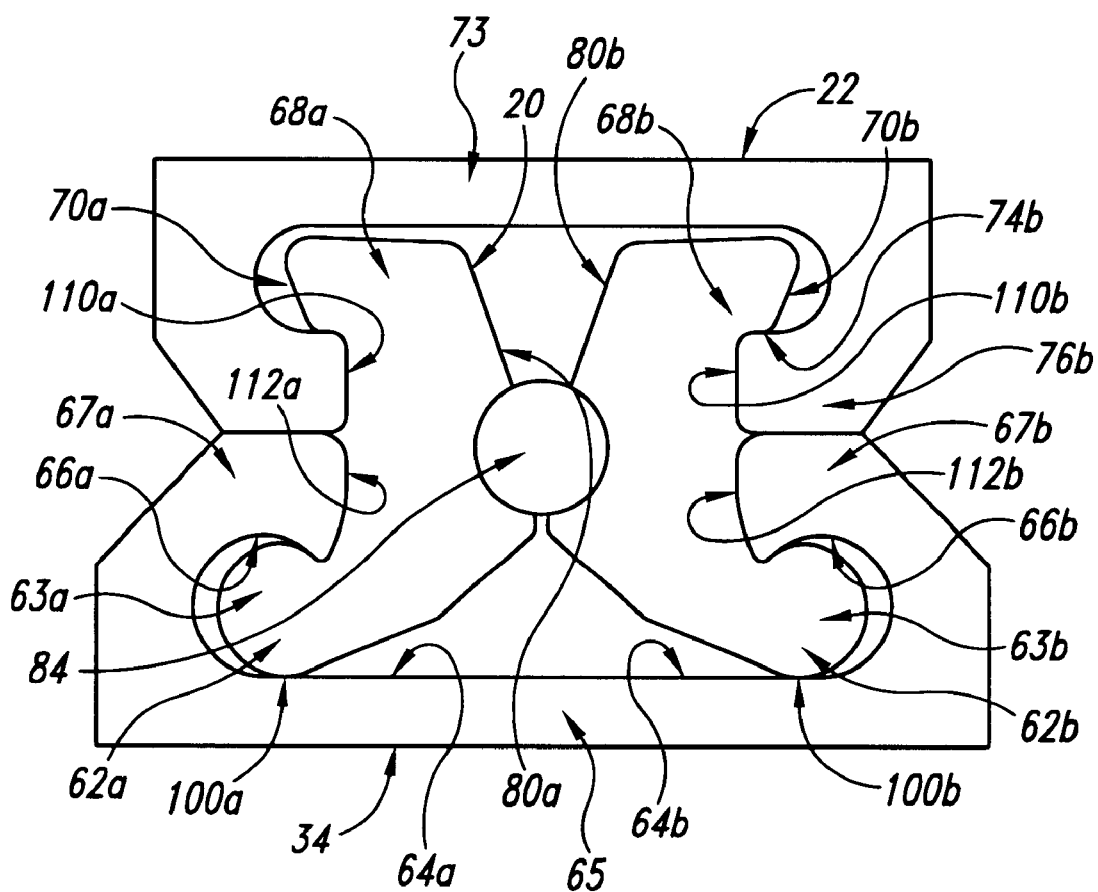

Locking of the panel 12 to the structure 14 is accomplished by the four release and locking mechanisms 20, each of which is attached to a respective actuation arm 28 at the left end thereof, at the opposite end of the arm 28 where the driver 42 is connected. As shown in FIGS. 3, 6 and 7, each panel channel receptacle 34 contains therein lower portions of a pair of left, right locking tongs 60a, 60b that extend along the length of the respective channel receptacle 34. Furthermore, the left locking tong 60a includes a leftward pointing locking foot 62a that extends into a lower left C-shaped cavity 63a of the panel channel receptacle 34, and the right locking tong 60b includes a rightward pointing locking foot 62b that extends into a lower right, reverse C-shaped cavity 63b of the panel channel receptacle 34. The left cavity 63a is formed by a flat surface 64a of a channel receptacle base 65, and a surface 66a of an upper left ledge 67a; and the right 63b is formed by a flat surface 64b of the channel receptacle base 65 and a surface 66b of an upper right ledge 67b.

In addition, the left locking tong 60a includes a leftward pointing nose 68a that is adapted to fit within an upper left C-shaped cavity 70a of the structure channel receptacle 22; and the right locking tong 60b includes a rightward pointing nose 68b that is adapted to fit within an upper right, reverse C-shaped cavity 70b of the structure channel receptacle 22. The left cavity 70a is formed by a flat surface 72a of a structure channel base 73 and a surface 74a of a lower ledge 76a; and the right cavity 70b is formed by a surface 72b of the structure channel base 73 and a surface 74b of a lower ledge 76b. The locking tongs 60a, 60b each include respective back portions 80a, 80b that have respective recesses 82a, 82b that together engage a floating locking pin 84 therebetween.

The locking mechanism 20 is caused to move from the unlocked position shown in FIG. 6, to the locked position shown in FIG. 7 by upward movement of the locking pin 84 that causes the left locking tong 60a to rotate in a counter-clockwise direction and the right locking tong 60b to rotate in a clockwise direction. This causes the nose 68a of the left locking tong 60a to move leftward into the left cavity 70a and the nose 68b of the right locking tong 60b to move rightward into the right cavity 70b. In this manner, upper surfaces 88a, 88b of the noses 68a , 68b, engage the surfaces 72a, 72b of the channel receptacle 22; and lower surfaces 90a, 90b of the noses 68a, 68b, engage the lower ledge surfaces 74a , 74b of the channel receptacle 22.

The previously mentioned movement of locking tongs 60a, 60b also causes the foot 62a of the left locking tong 60a to move slightly rightward while still remaining in the left cavity 63a; and the foot 62b of the right locking tong 60b to move slightly leftward while still remaining in the right cavity 63b. In this manner, bottom surfaces 100a, 100b of the feet 62a, 62b engage the surfaces 64a, 64b of the channel receptacle 34, and upper surfaces 102a, 102b of feet 62a, 62b engage the ledge surfaces 66a, 66b of the channel receptacle 34. As a result, any loads in a vertical direction (when viewing FIGS. 3, 6 and 7), as indicated by an imaginary line identified by a number 103, are transmitted from the structure 14 through the locking tongs 60a, 60b and through the panel 12.

Furthermore, when the locking tong 60a is in the locked position, a left front surface 106a that extends vertically between the locking nose 68a and the locking foot 62a engages a right vertical end surface 110a of the ledge 76a and a right vertical end surface 112a of the ledge 67a; and a right front surface 106b that extends vertically between the locking nose 68b and the locking foot 62b engages a left vertical end surface 110b of the upper ledge 76b and a right vertical end surface 112b of the lower ledge 67b. As a result, any loads in a horizontal direction (when viewing FIGS. 6 and 7), as indicated by an imaginary line identified by a number 113, are transmitted from the structure 14 through the locking tongs 60a, 60b and through the panel 12. As shown in FIG. 7, the locking tongs 60a, 60b do not fit entirely or precisely within the respective cavities 63a, 63b and 70a, 70b of the channel receptacles; however, there is sufficient engagement between the locking tongs and the channel receptacles to transmit the loads from the surrounding structure through the panel 12. This allows the panel 12 to be interchanged with like panels of the same size and design on other parts of the aircraft or with like panels of the same size and design on other aircraft.

To complete this description, movement of the locking pin 84 in the vertical direction (when viewing FIGS. 3 through 5) is accomplished by movement of a left end 120 of the actuator arm 28 in the vertical direction. More specifically, the left end 120 of the actuator arm 28 has a pair of forks 121 that form a slot 122 through which the locking pin 84 extends so that the forks 121 engage the locking pin 84. Inboard of the left end 120, there is a pivot pin 123 that extends through an opening in the actuator arm 28 and that is connected to an opposing pair of upstanding flanges 124 (FIG. 1) that are secured to the inboard surface of the panel 12. Movement of the right end of the actuator arm 28 in the vertical direction causes rotation of the actuator arm 28 about the pin 123 and vertical movement of the left end of the actuator arm 28 in a direction opposite to vertical movement of the right end of actuator arm 28.

As shown in FIG. 2, each pair of locking tongs 60$a$, 60$b$ extends the full length of the respective panel channel receptacle 34 except at the center edge of each panel side where the channel receptacles 34 are bisected and separated by the flanges 124.

In summary, when the quick release and fastening assembly 18 is in the unlocked position shown in FIG. 4, rotation of actuator 26 screw in a clockwise direction (when viewing FIG. 1) causes the driver 42 to move in a downward direction toward the panel 12. The corresponding downward movement of the right end of actuator arm 28 causes an upward movement of the left end of actuator arm 28 about pivot pin 123 and away from panel 12. The corresponding upward movement of locking pin 84 causes the tongs 60$a$, 60$b$ to move into the locked position shown in FIG. 7.

What is claimed is:

1. A cover assembly comprising:

a structure having an opening wherein at least one locking channel is fixed to the structure adjacent the opening;

a cover; and an apparatus for removably connecting the cover to the structure, the connecting apparatus comprising at least one connector having a pair of locking tongs each comprising a locking nose and a locking foot, an actuator that is accessible through an opening in the cover so that the actuator may be moved between a fastened position and an unfastened position, an actuator arm pivotally connected to the actuator and the connector and pivotally connected to the cover such that movement of the actuator from the unfastened position to the fastened position causes a first end of said actuator arm to move towards said cover and a second end of said actuator arm to move away from said cover in a direction which is generally perpendicular to said cover and moves the locking noses from a release position away from one another to a locking position, wherein when the locking noses are in the locking position, said locking noses releasably engage said locking channel to releasably connect the cover and the structure.

2. The cover assembly as set forth in claim 1 wherein:

when the actuator is moved between the fastened position and the unfastened position, the actuator is moved between a first position that is a first distance from the cover and a second position that is a second distance from the cover, said second distance being greater than the first distance.

3. The cover assembly according to claim 1 wherein said at least one locking channel comprises four said locking channels fixed to the structure adjacent the opening and said at least one connector comprises four said connectors.

4. The cover assembly according to claim 1 wherein an edge portion of the cover includes a panel channel.

5. The cover assembly according to claim 4 wherein said locking feet engage said panel channel.

* * * * *